(12) United States Patent
Ahn et al.

(10) Patent No.: US 11,573,409 B2
(45) Date of Patent: Feb. 7, 2023

(54) CONTACTLESS TYPE OPTICAL DEVICE

(71) Applicant: Suprema ID Inc., Seongnam-si (KR)

(72) Inventors: Wonseok Ahn, Yongin-si (KR); Bogun Park, Seoul (KR)

(73) Assignee: SUPREMA ID INC., Seongnam-si (KR)

( * ) Notice: Subject to any disclaimer, the term of this patent is extended or adjusted under 35 U.S.C. 154(b) by 0 days.

(21) Appl. No.: 17/488,645

(22) Filed: Sep. 29, 2021

(65) Prior Publication Data
US 2022/0373772 A1    Nov. 24, 2022

(30) Foreign Application Priority Data
May 18, 2021    (KR) .......................... 10-2021-0064342

(51) Int. Cl.
*A61B 5/1172*    (2016.01)
*G02B 13/00*    (2006.01)

(52) U.S. Cl.
CPC ................................. *G02B 13/005* (2013.01)

(58) Field of Classification Search
CPC ........... G06K 9/00033; G06K 9/00906; G06K 7/10702; G06K 9/00006; G06K 9/00013; G06K 9/00107; G06K 9/00201; A61B 5/1172; G02B 13/005
See application file for complete search history.

(56) References Cited

U.S. PATENT DOCUMENTS

| | | | | | |
|---|---|---|---|---|---|
| 3,138,059 | A | * | 6/1964 | White | A61B 5/1172 396/15 |
| 3,716,301 | A | * | 2/1973 | Caulfield | G06V 40/12 359/107 |
| 3,968,476 | A | * | 7/1976 | McMahon | G07C 9/37 382/127 |
| 5,077,803 | A | * | 12/1991 | Kato | G06K 9/00046 382/124 |
| 5,177,802 | A | * | 1/1993 | Fujimoto | G06V 40/1312 356/71 |
| 5,818,956 | A | * | 10/1998 | Tuli | G06V 40/1324 340/5.83 |

(Continued)

FOREIGN PATENT DOCUMENTS

KR    10-0895274 B1    4/2009

*Primary Examiner* — Balram T Parbadia
(74) *Attorney, Agent, or Firm* — Maier & Maier, PLLC

(57) ABSTRACT

A contactless type optical device includes an image photographing module configured to photograph a subject, the image photographing module including a photographing lens forming an image of light that is scattered from the subject and is incident on the photographing lens; an illuminator configured to radiate illumination light, the illuminator being disposed within a predetermined distance from the image photographing module; a first lens configured to reduce an incidence angle of the illumination light traveling from the illuminator; and a second lens having a first surface to which the illumination light passing through the first lens is incident to be transmitted, and a second surface to which the subject's scattered light scattered from the subject is incident to be transmitted. The photographing lens is disposed such that the subject's scattered light passing through the second lens is incident on the photographing lens.

14 Claims, 8 Drawing Sheets

(56) References Cited

U.S. PATENT DOCUMENTS

| | | | | |
|---|---|---|---|---|
| 5,974,162 | A | * | 10/1999 | Metz .................. G06V 40/1324 382/125 |
| 5,986,746 | A | * | 11/1999 | Metz .................. A61B 5/1172 356/71 |
| 6,061,463 | A | * | 5/2000 | Metz .................. G06V 40/1324 382/126 |
| 6,292,576 | B1 | * | 9/2001 | Brownlee .......... G06K 9/00006 340/5.83 |
| 2008/0298649 | A1 | * | 12/2008 | Ennis .................... G06V 40/45 382/125 |
| 2011/0163163 | A1 | * | 7/2011 | Rowe .................... G06V 40/45 235/462.25 |
| 2011/0200237 | A1 | * | 8/2011 | Nakamura ........... A61B 5/1172 382/115 |
| 2012/0076369 | A1 | * | 3/2012 | Abramovich ...... G06V 40/1312 382/126 |
| 2015/0146943 | A1 | * | 5/2015 | Son ........................ G06V 40/67 382/124 |
| 2018/0268193 | A1 | * | 9/2018 | Badzinski ............ G06V 10/143 |
| 2019/0087632 | A1 | * | 3/2019 | Raguin .............. G06V 40/1365 |
| 2019/0213378 | A1 | * | 7/2019 | Li ...................... G06V 40/1335 |
| 2020/0074132 | A1 | * | 3/2020 | Shannon ............ G06V 40/1312 |
| 2020/0193138 | A1 | * | 6/2020 | Li ........................ G06K 9/6256 |
| 2020/0356752 | A1 | * | 11/2020 | Mozaffari ........... G06V 10/143 |
| 2021/0042494 | A1 | * | 2/2021 | Xie .................... G06V 40/1318 |

* cited by examiner

CONTACTLESS TYPE OPTICAL DEVICE

TECHNICAL FIELD

The present disclosure relates to a contactless type optical device for acquiring a fingerprint image in a contactless manner.

BACKGROUND

Generally, a contact type digital optical device (or contact type image acquisition device) uses a method of correcting an image based on a PPI (Pixels per inch) of a subject's image obtained from a contact surface so as to achieve the PPI of a uniform image.

However, since a contactless type optical device (or contactless type image acquisition device) is configured such that a subject to be photographed is not fixed, the PPI of a photographed image is changed depending on a distance (or photographing distance) between the subject and the contactless type optical device. Further, the contactless type optical device undergoes a change in shade of the acquired subject's image depending on the position of an illumination.

Therefore, there is a need for a contactless type optical device (or contactless type image acquisition device) that has little change in shade of the subject's image while acquiring the image of the subject having a uniform PPI regardless of a distance from the subject.

SUMMARY

In view of the above, the present disclosure provides a contactless type optical device capable of acquiring a fingerprint image in a contactless manner.

Further, the present disclosure provides a contactless type optical device that has little change in shade of a subject's image while acquiring the subject's image having a uniform PPI regardless of a distance from the subject.

However, the present disclosure is not limited to the above-described objectives, and those skilled in the art can clearly understand other objectives from the following description.

In accordance with a first embodiment of the present disclosure, there is provided a contactless type optical device including: an image photographing module configured to photograph a subject, the image photographing module including a photographing lens forming an image of light that is scattered from the subject and is incident on the photographing lens; an illuminator configured to radiate illumination light, the illuminator being disposed within a predetermined distance from the image photographing module; a first lens configured to reduce an incidence angle of the illumination light traveling from the illuminator; and a second lens having a first surface to which the illumination light passing through the first lens is incident to be transmitted, and a second surface to which the subject's scattered light scattered from the subject is incident to be transmitted, wherein the photographing lens is disposed such that the subject's scattered light passing through the second lens is incident.

The contactless type optical device may further include a reflector to reflect the subject's scattered light so that the subject's scattered light is incident on the image photographing module, wherein the first lens is disposed to be spaced apart from the illuminator to face the illuminator.

The reflector may include a first reflector and a second reflector disposed at respective preset angles between the image photographing module and the second lens to reflect the subject's scattered light, and the first reflector and the second reflector may be disposed to be spaced apart from each other by a predetermined distance to face each other.

The illuminator, the reflector, and the second lens may be configured such that the illumination light is incident towards the second lens without being reflected by the reflector.

The second lens may be configured such that the subject's scattered light scattered from the subject is incident on the image photographing module at a view angle ranging from $-5°$ to $5°$.

The first lens may include a convex lens.

The second lens may be formed of an objective lens that is a convex lens.

An optical axis of the illuminator may be disposed between the first reflector and the second reflector.

In accordance with a second embodiment of the present disclosure, there is provided a contactless type optical device including: an image photographing module configured to photograph a subject, the image photographing module including a photographing lens forming an image of light that is scattered from the subject and is incident on the photographing lens; an illuminator configured to radiate illumination light, the illuminator being disposed within a predetermined distance from the image photographing module; a first lens configured to reduce an incidence angle of the illumination light traveling from the illuminator; and a glass plate having a first surface to which the illumination light passing through the first lens is incident to be transmitted, and a second surface to which the subject's scattered light scattered from the subject is incident to be transmitted, wherein the photographing lens is disposed such that the subject's scattered light passing through the glass plate is incident on the photographing lens.

The contactless type optical device may further include a reflector to reflect the subject's scattered light so that the subject's scattered light is incident on the image photographing module. The first lens may be disposed to be spaced apart from the illuminator to face the illuminator.

The reflector may include a first reflector and a second reflector disposed at respective preset angles between the image photographing module and the glass plate to reflect the subject's scattered light, and the first reflector and the second reflector may be disposed to be spaced apart from each other by a predetermined distance to face each other.

At least one of the first reflector and the second reflector may include a concave mirror.

The illuminator, the reflector, and the glass plate may be configured such that the illumination light is incident towards the glass plate without being reflected by the reflector.

The glass plate may be configured such that the subject's scattered light scattered from the subject is incident on the image photographing module at a view angle ranging from $-5°$ to $5°$.

The first lens may include a convex lens.

An optical axis of the illuminator may be disposed between the first reflector and the second reflector.

A contactless type optical device according to an embodiment of the present disclosure is configured such that a subject's scattered light scattered from a subject located at a focal distance of a light transmitter (second lens or glass plate) located at a focal distance of a photographing lens of an image photographing module is incident on a light transmitter to be transmitted and then the transmitted subject's scattered light is incident on the image photographing module, so that it is possible to acquire a subject's image having a uniform PPI (Pixels per inch) regardless of a distance between the image photographing module and the subject.

Since the subject's scattered light scattered from the subject is reflected by a reflector and is incident on the image photographing module, a volume required for the light scattered from the subject to be incident on the image photographing module is reduced as compared to a case where the subject's scattered light scattered from the subject is linearly incident on the image photographing module, and thereby the size of a product can be reduced.

Further, a contactless type optical device according to an embodiment of the present disclosure is configured such that, while illumination light radiated by an illuminator is transmitted to a first lens and a second lens, the incidence angle of the transmitted light is reduced and the density of the light is increased, so that the image photographing module can acquire a subject's image in which an outline of a subject is clear and a change in shade is little.

However, the present disclosure is not limited to the above-described effects, and those skilled in the art can clearly understand other effects from the following description.

DETAILED DESCRIPTION OF THE EMBODIMENTS

Hereinafter, specific embodiments for implementing a spirit of the present disclosure will be described in detail with reference to the drawings.

In describing the present disclosure, detailed descriptions of known configurations or functions may be omitted to clarify the present disclosure.

When an element is referred to as being 'connected' to, 'supported' by, 'accessed' to, 'supplied' to, 'transferred' to, or 'contacted' with another element, it should be understood that the element may be directly connected to, supported by, accessed to, supplied to, transferred to, or contacted with another element, but that other elements may exist in the middle.

The terms used in the present disclosure are only used for describing specific embodiments, and are not intended to limit the present disclosure. Singular expressions include plural expressions unless the context clearly indicates otherwise.

Further, in the present disclosure, it is to be noted that expressions, such as the upper side and the lower side, are described based on the illustration of drawings, but may be modified if directions of corresponding objects are changed. For the same reasons, some components are exaggerated, omitted, or schematically illustrated in the accompanying drawings, and the size of each component does not fully reflect the actual size.

Terms including ordinal numbers, such as first and second, may be used for describing various elements, but the corresponding elements are not limited by these terms. These terms are only used for the purpose of distinguishing one element from another element.

In the present specification, it is to be understood that the terms such as "including" are intended to indicate the existence of the certain features, areas, integers, steps, actions, elements, combinations, and/or groups thereof disclosed in the specification, and are not intended to preclude the possibility that one or more other certain features, areas, integers, steps, actions, elements, combinations, and/or groups thereof may exist or may be added.

Before describing a contactless type optical device 1 according to an embodiment of the present disclosure with reference to the accompanying drawings, a subject's image acquired depending on a distance between an image photographing module and a subject or between an illumination and the subject will be described in brief with reference to FIGS. 1 to 4.

Figure 1:
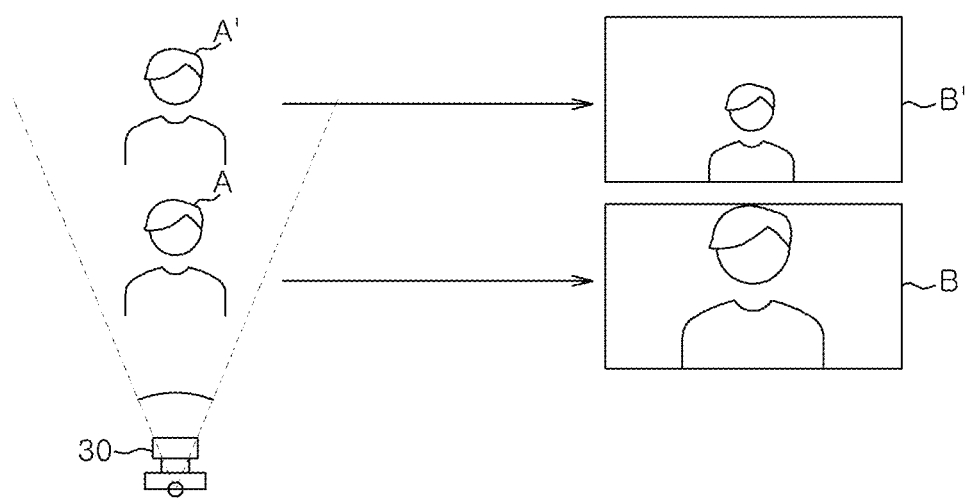
FIG. 1 is a diagram illustrating a change in PPI of a subject's image acquired depending on a distance between a subject and an image photographing module.
Figure 2:
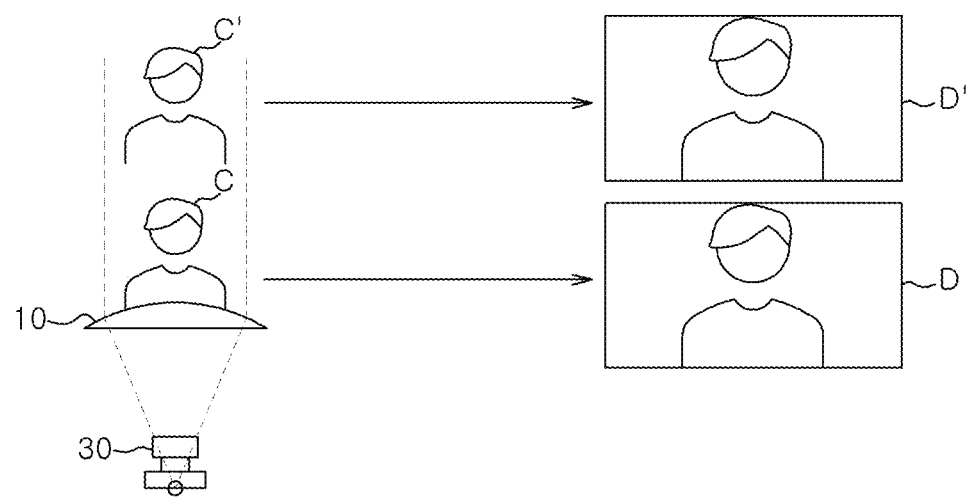
FIG. 2 is a diagram illustrating the acquisition of a subject's image having a uniform PPI regardless of a distance between a subject and an image photographing module using an objective lens that is a convex lens.

FIG. 1 is a diagram illustrating a change in PPI of a subject's image acquired depending on a distance between a subject and an image photographing module, and FIG. 2 is a diagram illustrating the acquisition of a subject's image having a uniform PPI regardless of a distance between a subject and an image photographing module using an objective lens that is a convex lens.

Referring to FIG. 1, when comparing an image B capturing a subject A located at a short distance from the image photographing module 30 through an image photographing module 30 with an image B' capturing a subject A' located at a long distance from the image photographing module 30 through the image photographing module 30, it can be seen that the image B capturing the subject A located at the short distance is larger than the image B' capturing the subject A' located at the long distance, and the PPI of the image B capturing the subject A located at the short distance is high.

In contrast, it can be seen that the image B' capturing the subject A' located at the long distance is smaller than the image B capturing the subject a located at the short distance, and the PPI of the image B' capturing the subject A' located at the long distance is low.

Referring to FIG. 2, when a subject's image is acquired using an objective lens 10 that is a convex lens spaced apart from the image photographing module 30 by a predetermined distance in a direction opposite to the image photographing module 30, it is possible to have the uniform PPI of an image and photograph the subject of a uniform size regardless of a distance to the subject.

In more detail, when the image photographing module 30 photographs the subject, light passing through the objective lens 10 that is the convex lens spaced apart from the image photographing module 30 by a predetermined distance in a direction opposite to the image photographing module 30 may be transmitted as telecentric parallel light, and the focal distance of the objective lens 10 may be infinite.

The telecentric parallel light refers to light in which an exit pupil of radiated light is located at an infinite circle. Specifically, a path of the telecentric parallel light means that light is radiated in a parallel or an approximately parallel form.

Since a subject C located at a short distance from the image photographing module 30 is located at the focal distance of the objective lens 10 that is the convex lens, and a subject C' located at a long distance from the image photographing module 30 is also located at the focal distance of the objective lens 10 that is the convex lens, light scattered from the subject located at the focal distance is incident on the image photographing module 30, and thereby both an image D capturing the subject C located at the short distance through the image photographing module 30 and an image D' capturing the subject C' located at the long distance from the image photographing module 30 may have a uniform PPI.

Figure 3:
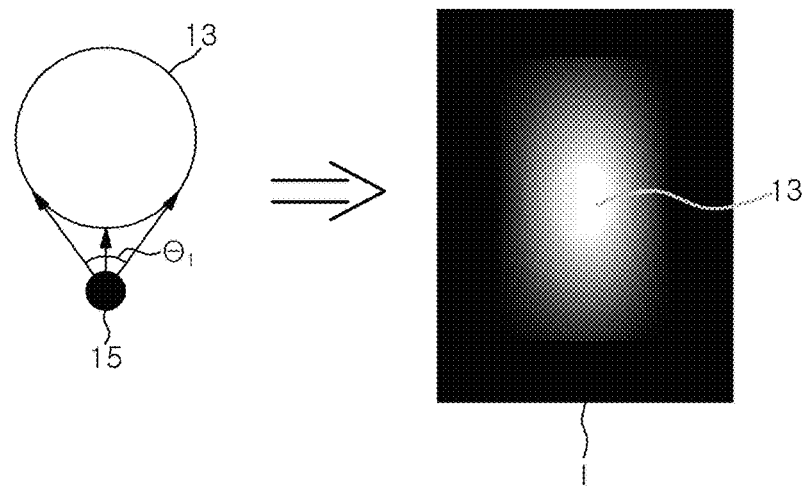
FIG. 3 is a diagram illustrating a subject's image acquired by an image photographing module when a subject and an illumination are at a short distance.
Figure 4:
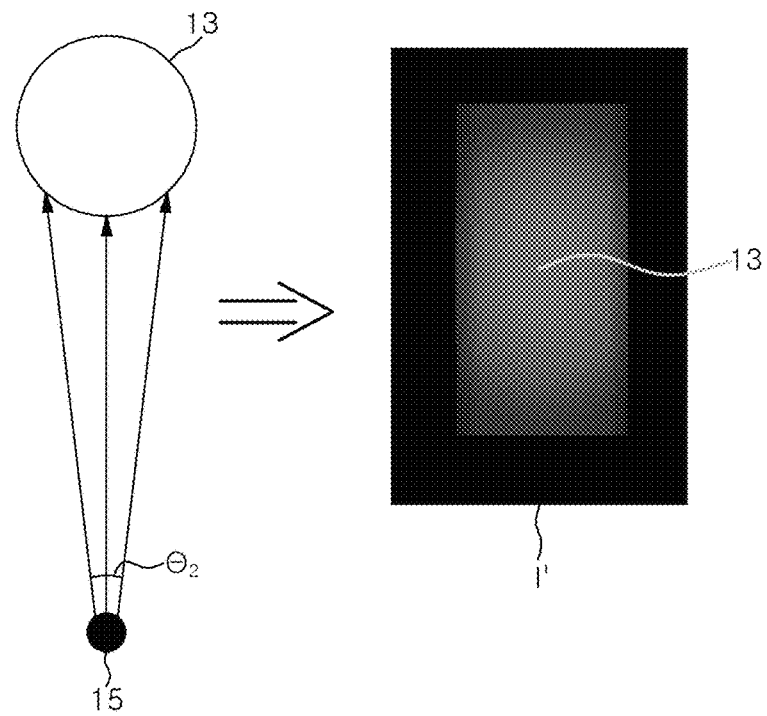
FIG. 4 is a diagram illustrating a subject's image acquired by the image photographing module when a subject and an illumination are at a long distance.

FIG. 3 is a diagram illustrating a subject's image acquired by the image photographing module 30 when a subject and an illumination are at a short distance, and FIG. 4 is a diagram illustrating a subject's image acquired by the image photographing module 30 when a subject and an illumination are at a long distance.

Referring to FIG. 3, when a subject 13 and an illumination 15 are at the short distance, the image I of the subject 13 acquired by the image photographing module 30 undergoes a large change in shade (or brightness), and an outline of the subject 13 may not be clear.

Referring to FIG. 4, when the subject 13 and the illumination 15 are at the long distance, the image I' of the subject 13 acquired by the image photographing module 30 undergoes a small change in shade (or brightness), and an outline of the subject 13 may be clear.

When the subject 13 and the illumination 15 are at the long distance, the density of light radiated from the illumination 15 is reduced depending on a distance between the subject 13 and the illumination 15, so that the image of the subject 13 acquired by the image photographing module 30 may become dark.

Comparing an incidence angle $\theta_1$ of the light radiated from the illumination 15 when the subject 13 and the illumination 15 are at the short distance with an incidence angle $\theta_2$ of the light radiated from the illumination 15 when the subject 13 and the illumination 15 are at the long distance, it can be seen that the incidence angle $\theta_2$ of the light radiated from the illumination 15 when the subject 13 and the illumination 15 are at the long distance is smaller than the incidence angle $\theta_1$ of the light radiated from the illumination 15 when the subject 13 and the illumination 15 are at the short distance.

The smaller the incidence angle of the light is, the clearer the subject's outline in the subject's image acquired by the image photographing module 30 may be. However, when a distance between the subject 13 and the illumination 15 increases to reduce the incidence angle, the density of light reaching the subject 13 from the illumination 15 is reduced, so that the acquired image of the subject 13 may become dark.

Figure 5:
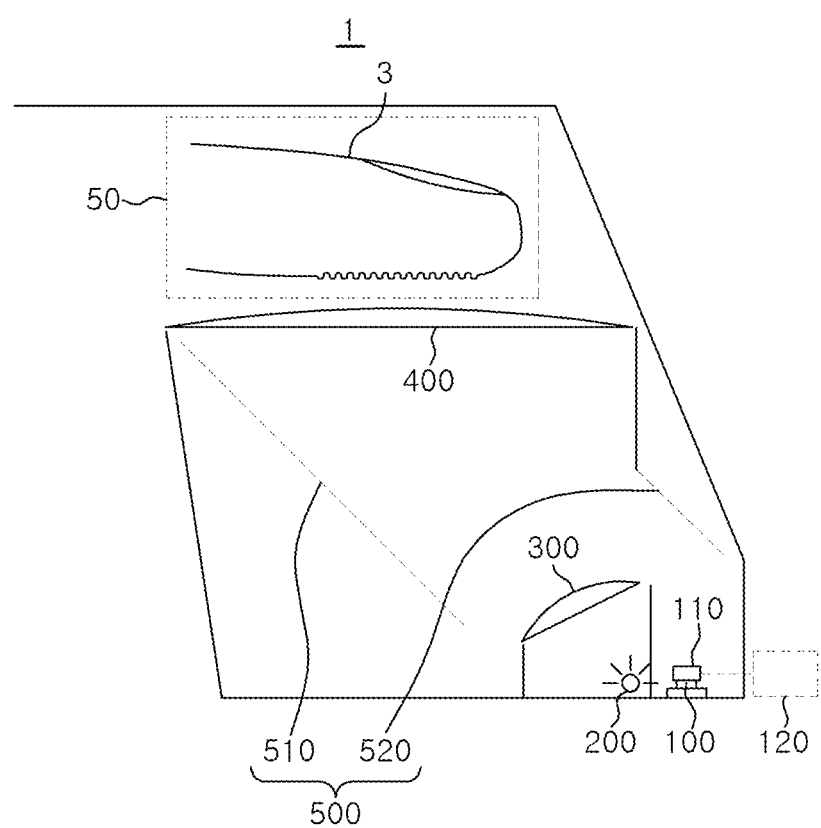
FIG. 5 is a diagram illustrating the configuration of a contactless type optical device in accordance with an embodiment of the present disclosure.
Figure 6:
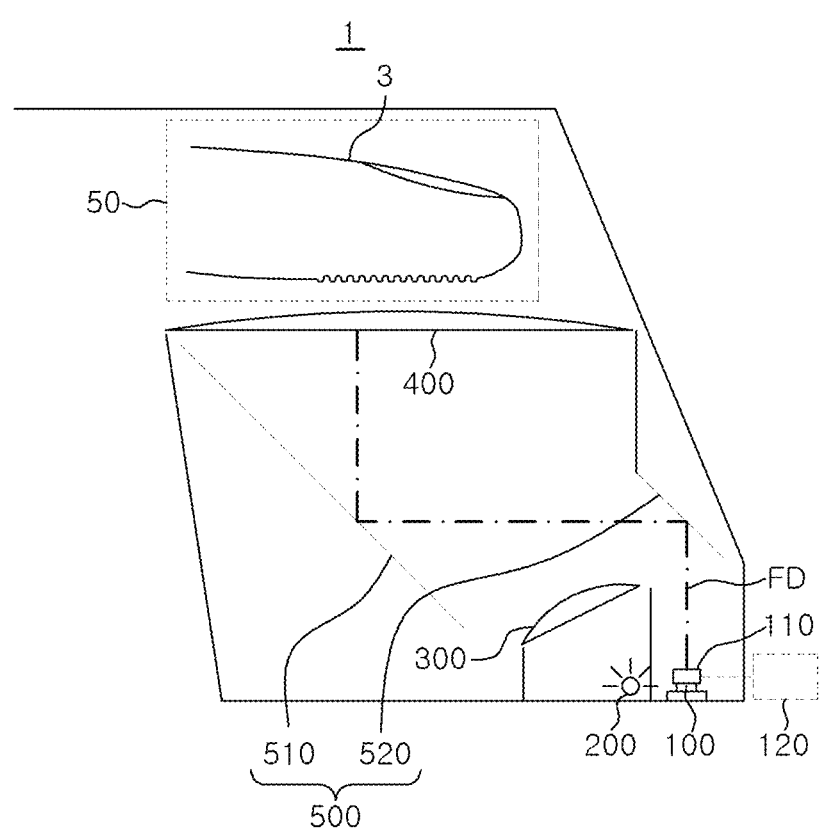
FIG. 6 is a diagram illustrating a focal distance of a photographing lens in the contactless type optical device in accordance with the embodiment of the present disclosure.

FIG. 5 is a diagram illustrating the configuration of a contactless type optical device in accordance with the embodiment of the present disclosure, and FIG. 6 is a diagram illustrating a focal distance of a photographing lens in the contactless type optical device in accordance with the embodiment of the present disclosure.

The contactless type optical device 1 in accordance with the embodiment of the present disclosure may acquire a fingerprint image in a contactless manner. Referring to FIG. 5, the contactless type optical device 1 in accordance with the embodiment of the present disclosure may include an image photographing module 100, an illuminator 200, a first lens 300, a second lens 400, and a reflector 500.

The image photographing module 100 may photograph a subject 3. The subject 3 may include a user's finger, and the image photographing module 100 may be a camera that photographs the fingerprint of the user's finger. The image photographing module 100 may include a photographing lens 110 and an image information generator 120.

The photographing lens 110 may form an image of light that is scattered from the subject 3 and then is incident.

The image information generator 120 may convert the formed light image into an electrical signal, and then may generate image information about the subject based on the electrical signal.

The illuminator 200 may be disposed within a predetermined distance from the image photographing module 100, and may radiate illumination light. The illuminator 200 may radiate the illumination light onto a photographing area 50 for the subject 3 that will be described later.

The illuminator 200 may be disposed within a predetermined distance from the image photographing module 100 in a horizontal axis to prevent the formation of a light spot due to the illumination light radiated from the illuminator 200 in addition to the subject's scattered light that is scattered from the subject 3 and is incident on the photographing lens 110.

The first lens 300 may reduce the incidence angle of the illumination light traveling from the illuminator 200. The first lens 300 may be inclined at a predetermined angle (e.g., 20° to 45°) with respect to the orientation of the second lens 400, and may be disposed to be deflected from the illuminator 200 and face the second lens 400. The first lens 300 may be disposed between the illuminator 200 and the second lens 400 that will be described later. The incidence angle of the illumination light radiated from the illuminator 200 may be reduced according to the arrangement of the first lens 300. The first lens 300 may include a convex lens.

The first lens 300 may be configured such that the incidence angle of the illumination light passing through the first lens 300 forms an angle ranging from 20° to 60°.

The second lens 400 may be configured such that illumination light radiated from the illuminator 200 is incident on the first lens 300, illumination light passing through the first lens 300 is incident on and transmitted to a first surface of the second lens 400, and the subject's scattered light scattered from the subject 3 is incident on and transmitted to a second surface of the second lens 400. The first surface on which illumination light passing through the first lens 300 is incident may be a surface facing the first lens 300, and the second surface on which the subject's scattered light scattered from the subject 3 is incident may be a surface facing to the subject 3. The second lens 400 may be formed of the objective lens that is the convex lens.

The photographing lens 110 may be disposed such that the subject's scattered light passing through the second lens 400 is incident.

The light passing through the second lens 400 may travel in parallel and telecentrically. In this regard, the expression "light travels telecentrically and in parallel" means that the path of light is in a parallel or approximately parallel form. The incidence angle of the parallel light passing through the second lens 400 may be formed at an angle ranging from −10° to 10° from the second lens 400 such that light travels telecentrically and in parallel. The light passing through the second lens 400 may be transmitted in the form of telecentric and parallel light, so that the focal distance of the second lens 400 may be infinite.

Therefore, since the focal distance of the second lens 400 is increased, the subject's scattered light scattered from the subject 3 located at the focal distance of the second lens 300 is incident on the image photographing module 100, so that the contactless type optical device 1 may acquire image information of the subject having a uniform PPI regardless of a distance between the image photographing module 100 and the subject 3.

The second lens 400 may be disposed between the photographing area 50 of the subject 3 and the image photographing module 100. The photographing area 50 of the subject 3 may be an area facing the second surface of the second lens 400 through which light is transmitted from the second lens 400. The second lens 400 may be configured such that light scattered from the subject 3 is incident on the image photographing module 100 at a view angle ranging from −5° to 5°.

Meanwhile, referring to FIG. 6, the second lens 300 may be disposed on a focal distance FD of the photographing lens 110 in the image photographing module 100.

The reflector 500 may reflect the subject's scattered light scattered from the subject 3 so that the subject's scattered light scattered from the subject 3 is incident on the image photographing module 100. The reflector 500 may include a plurality of reflectors. The reflector 500 may include a first reflector 510 and a second reflector 520 to reflect the subject's scattered light scattered from the subject 3. The first reflector 510 and the second reflector 520 may be spaced apart from each other by a predetermined distance in opposite directions. Each of the first reflector 510 and the second reflector 520 may include a mirror. Further, an optical axis of the illuminator 200 may be disposed between the first reflector 510 and the second reflector 520.

The first reflector 510 and the second reflector 520 may reflect the subject's scattered light scattered from the subject 3.

In the contactless type optical device 1 according to the embodiment of the present disclosure, the subject's scattered light scattered from the subject 3 is reflected by the first reflector 510 and the second reflector 520 and then is incident on the image photographing module 100, so that a volume required for the light scattered from the subject 3 to be incident on the image photographing module 100 is reduced as compared to a case where the subject's scattered light scattered from the subject 3 is linearly incident on the image photographing module 100. Consequently, the size of a product (contactless type optical device) can be reduced.

Figure 7:
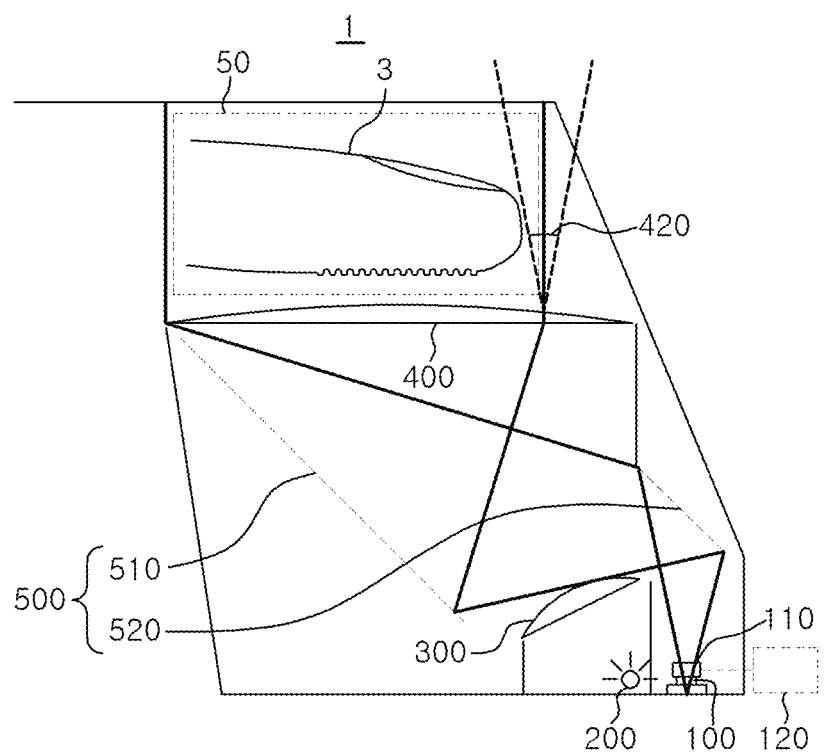
FIG. 7 is a diagram illustrating a focal distance of a photographing lens of an image photographing module in the contactless type optical device in accordance with the embodiment of the present disclosure.

FIG. 7 is a diagram illustrating the focal distance of the photographing lens of the image photographing module in the contactless type optical device in accordance with the embodiment of the present disclosure.

Referring to FIG. 7, it can be seen that the light scattered from the subject 3 is reflected by the first reflector 510 and the second reflector 520 to be incident on the photographing lens 110.

The second lens 400 may be configured such that the subject's scattered light 420 scattered from the subject 3 is incident on the image photographing module 100 at a view angle ranging from −5° to 5°.

Figure 8:
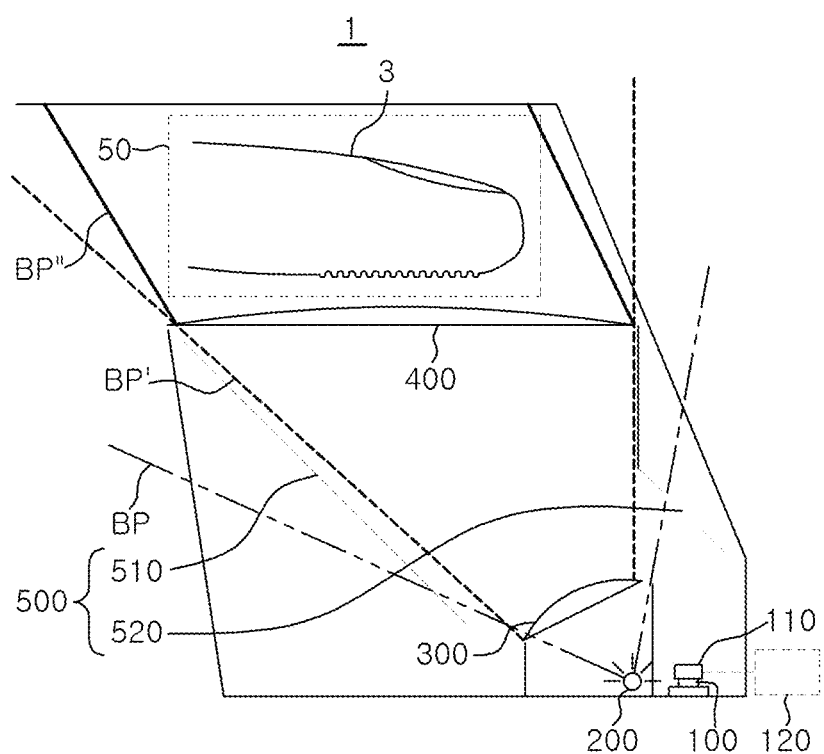
FIG. 8 is a diagram illustrating a path of light passing through a first lens in the contactless type optical device in accordance with the embodiment of the present disclosure.

FIG. 8 is a diagram illustrating the path of light passing through the first lens 300 in the contactless type optical device in accordance with the embodiment of the present disclosure.

Referring to FIG. 8, assuming that there is no first lens 300, illumination light BP radiated from the illuminator 200 may not be radiated onto the photographing area 50 of the subject 3, while illumination light radiated from the illuminator 200 may be incident on the first lens 300 and illumination light BP' passing through the first lens 300 may be radiated onto the photographing area 50 of the subject 3.

Since the incidence angle of the illumination light passing through the first lens 300 is smaller than the incidence angle of the illumination light radiated from the illuminator 200, the density of the transmitted illumination light may be increased.

The optical device 1 according to the embodiment of the present disclosure may prevent light loss, because it is possible to prevent the dispersion of light bundle BP'' radiated onto the photographing area 50 of the subject 3 while the illumination light radiated from the illuminator 200 is transmitted to the first lens 300 and the illumination light BP' passing through the first lens 300 is transmitted to the second lens 400.

The illuminator 200, the reflector 500, and the second lens 400 may be configured such that illumination light radiated from the illuminator 200 is incident on the second lens 400 without being reflected by the reflector 500.

As the illumination light radiated from the illuminator 200 is transmitted to the first lens 300, the incidence angle of the illumination light passing through the first lens 300 becomes smaller than the incidence angle of the illumination light radiated from the illuminator 200. As the illumination light passing through the first lens 300 is transmitted to the second lens 400, the incidence angle of the light Br radiated onto the photographing area 50 of the subject 3 may become smaller than the incidence angle of the illumination light transmitted to the first lens 300.

As the incidence angle of the illumination light Br radiated onto the photographing area 50 of the subject 3 becomes smaller than the incidence angle of the illumination light radiated from the illuminator 200, the image photographing module 100 may acquire the image in which the subject's outline is clear.

In the contactless type optical device 1 according to the embodiment of the present disclosure, while the illumination light radiated from the illuminator 200 passes through the first lens 300 and the second lens 400, the incidence angle of the transmitted illumination light becomes smaller and the density of light increases, so that the image photographing module 100 may acquire the subject's image in which the outline of the subject 3 is clear and a change in shade is little.

Figure 9:
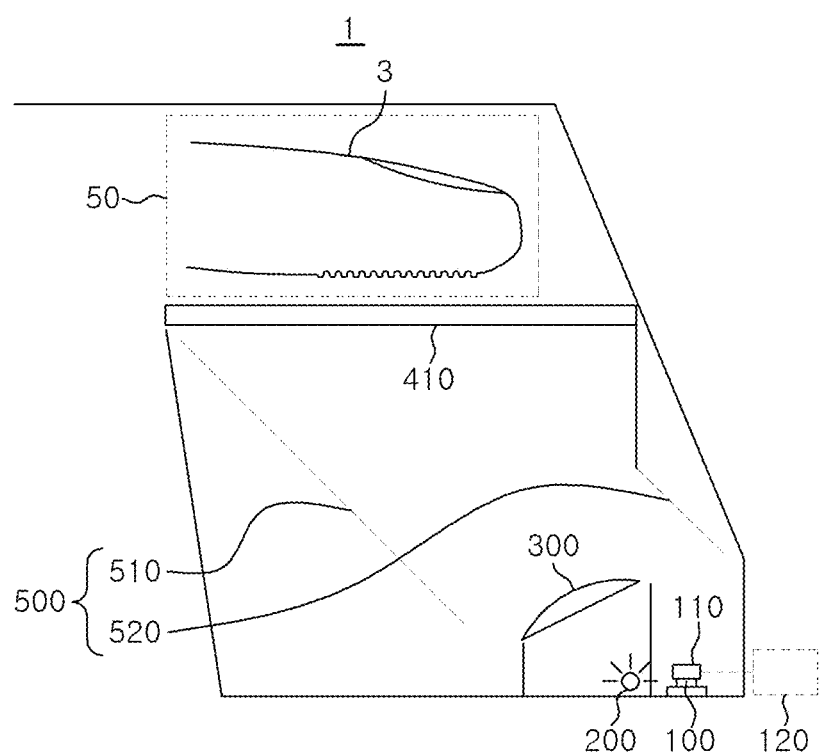
FIG. 9 is a diagram illustrating the configuration of a contactless type optical device in accordance with another embodiment of the present disclosure.

FIG. 9 is a diagram illustrating the configuration of a contactless type optical device in accordance with another embodiment of the present disclosure.

Referring to FIG. 9, the contactless type optical device 1 in accordance with another embodiment of the present disclosure may include an image photographing module 100, an illuminator 200, a first lens 300, a glass plate 410, and a reflector 500.

Here, since the image photographing module 100, the illuminator 200, and the first lens 300 are the same as those of FIG. 5, a detailed description thereof will be omitted. The glass plate 410 may be configured such that illumination light radiated from the illuminator 200 is incident on the first lens 300, illumination light passing through the first lens 300 is incident on and transmitted to a first surface of the glass plate 410, and the subject's scattered light scattered from the subject 3 is incident on and transmitted to a second surface of the glass plate 410. The first surface of the glass plate 410 on which illumination light passing through the first lens 300 is incident may be a surface facing the first lens 300, and the second surface of the glass plate 410 on which the subject's scattered light scattered from the subject 3 is incident may be a surface facing the subject 3. The glass plate 410 may be disposed on the focal distance of the photographing lens 110.

The photographing lens 110 may be disposed such that the subject's scattered light scattered from the subject 3 passing through the glass plate 410 is incident.

The light passing through the glass plate 410 may travel in parallel and telecentrically. In this regard, the expression "light travels telecentrically and in parallel" means that the path of light is in a parallel or an approximately parallel form. The incidence angle of the parallel light passing through the glass plate 410 may be formed at an angle ranging from −10° to 10° with respect to the glass plate 410 such that light travels telecentrically and in parallel.

The glass plate 410 may be disposed between the photographing area 50 of the subject 3 and the image photographing module 100. The photographing area 50 of the subject 3 may be an area facing a surface through which light is transmitted from the glass plate 410. The glass plate 410 may be configured such that the subject's scattered light scattered from the subject 3 is incident on the image photographing module 100 at a view angle ranging from −5° to 5°.

The reflector 500 may reflect the subject's scattered light scattered from the subject 3 so that the subject's scattered light scattered from the subject 3 is incident on the image photographing module 100. The reflector 500 may include a plurality of reflectors. The reflector 500 may include a first reflector 510 and a second reflector 520 to reflect the subject's scattered light scattered from the subject 3. The first reflector 510 and the second reflector 520 may be spaced apart from each other by a predetermined distance in opposite directions. Further, an optical axis of the illuminator 200 may be disposed between the first reflector 510 and the second reflector 520.

The first reflector 510 and the second reflector 520 may include concave mirrors.

The concave mirror may have effects similar to those of an objective lens implemented as a convex lens.

The first reflector 510 and the second reflector 520 may reflect the subject's scattered light scattered from the subject 3.

In the contactless type optical device 1 according to another embodiment of the present disclosure, the subject's scattered light scattered from the subject 3 is reflected by the first reflector 510 and the second reflector 520 and then is incident on the image photographing module 100, so that a volume required for the light scattered from the subject 3 to be incident on the image photographing module 100 is reduced as compared to a case where the subject's scattered light scattered from the subject 3 is linearly incident on the image photographing module 100. Consequently, the size of a product (contactless type optical device) can be reduced.

As described above, a contactless type optical device according to the embodiment of the present disclosure is configured such that subject's scattered light scattered from a subject located at a focal distance of a light transmitter (second lens or glass plate) located at a focal distance of a photographing lens of an image photographing module is incident on a light transmitter to be transmitted and then the transmitted subject's scattered light is incident on the image photographing module, so that it is possible to acquire a subject's image having a uniform PPI (Pixels per inch) regardless of a distance between the image photographing module and the subject.

Since the subject's scattered light scattered from the subject is reflected by the reflector and is incident on the image photographing module, a volume required for the light scattered from the subject to be incident on the image photographing module is reduced as compared to a case where the subject's scattered light scattered from the subject is linearly incident on the image photographing module, and thereby the size of a product can be reduced.

Further, a contactless type optical device according to the embodiment of the present disclosure is configured such that, while illumination light radiated by an illuminator is transmitted to the first lens and the second lens, the incidence angle of the transmitted light is reduced and the density of the light is increased, so that the image photographing module can acquire a subject's image in which an outline of a subject is clear and a change in shade is little.

The examples of the present disclosure have been described above as specific embodiments, but these are only examples, and the present disclosure is not limited thereto, and should be construed as having the widest scope according to the technical spirit disclosed in the present specification. A person skilled in the art may combine/substitute the disclosed embodiments to implement a pattern of a shape that is not disclosed, but it also does not depart from the scope of the present disclosure. In addition, those skilled in the art can easily change or modify the disclosed embodiments based on the present specification, and it is clear that such changes or modifications also belong to the scope of the present disclosure.

What is claimed is:

1. A contactless type optical device comprising:
    an image photographing module configured to photograph a subject, the image photographing module including a photographing lens forming an image of light that is scattered from the subject and is incident on the photographing lens;
    an illuminator configured to radiate illumination light, the illuminator disposed on a plane within a predetermined distance from the image photographing module;
    a first lens configured to reduce an incidence angle of the illumination light traveling from the illuminator;
    a second lens having a first surface to which the illumination light passing through the first lens is incident to be transmitted, and a second surface to which the subject's scattered light scattered from the subject is incident to be transmitted; and
    a reflector to reflect the subject's scattered light so that the subject's scattered light is incident on the image photographing module,
    wherein the photographing lens is disposed such that the subject's scattered light passing through the second lens is incident on the photographing lens, wherein the image photographing module is disposed on the plane on which the illuminator is disposed, wherein the first lens is disposed to be spaced apart from the illuminator to face the illuminator, wherein the reflector includes a first reflector and a second reflector disposed between the first lens and the second lens, wherein the first reflector and the second reflector are disposed to be spaced apart from each other by a predetermined distance to face each other while no other reflectors are placed between the first reflector and the second reflector, and wherein a distance between the first reflector and the second reflector is larger than a diameter of the first lens and smaller than a diameter of the second lens.

2. The contactless type optical device of claim 1, wherein the first reflector and the second reflector are disposed at respective preset angles between the image photographing module and the second lens to reflect the subject's scattered light.

3. The contactless type optical device of claim 2, wherein an optical axis of the illuminator is disposed between the first reflector and the second reflector.

4. The contactless type optical device of claim 1, wherein the illuminator, the reflector, and the second lens are configured such that the illumination light is incident towards the second lens without being reflected by the reflector.

5. The contactless type optical device of claim 1, wherein the second lens is configured such that the subject's scattered light scattered from the subject is incident on the image photographing module at a view angle ranging from −5° to 5°.

6. The contactless type optical device of claim 1, wherein the first lens includes a convex lens.

7. The contactless type optical device of claim 1, wherein the second lens includes an objective lens that is a convex lens.

8. A contactless type optical device comprising:
an image photographing module configured to photograph a subject, the image photographing module including a photographing lens forming an image of light that is scattered from the subject and is incident on the photographing lens;
an illuminator configured to radiate illumination light, the illuminator being disposed on a plane within a predetermined distance from the image photographing module;
a first lens configured to reduce an incidence angle of the illumination light traveling from the illuminator;
a glass plate having a first surface to which the illumination light passing through the first lens is incident to be transmitted, and a second surface to which the subject's scattered light scattered from the subject is incident to be transmitted; and
a reflector to reflect the subject's scattered light so that the subject's scattered light is incident on the image photographing module, wherein the photographing lens is disposed such that the subject's scattered light passing through the glass plate is incident on the photographing lens, and wherein the image photographing module is disposed on the plane on which the illuminator is disposed, wherein the reflector comprises a first reflector and a second reflector disposed between the first lens and the glass plate, wherein the first reflector and the second reflector are disposed to be spaced apart from each other by a predetermined distance to face each other while no other reflectors are placed between the first reflector and the second reflector, and wherein a distance between the first reflector and the second reflector is larger than a diameter of the first lens and smaller than an overall length of the glass plate.

9. The contactless type optical device of claim 8, wherein the first reflector and the second reflector disposed at respective preset angles between the image photographing module and the glass plate to reflect the subject's scattered light.

10. The contactless type optical device of claim 9, wherein at least one of the first reflector and the second reflector includes a concave mirror.

11. The contactless type optical device of claim 9, wherein an optical axis of the illuminator is disposed between the first reflector and the second reflector.

12. The contactless type optical device of claim 8, wherein the illuminator, the reflector, and the glass plate are configured such that the illumination light is incident towards the glass plate without being reflected by the reflector.

13. The contactless type optical device of claim 8, wherein the glass plate is configured such that the subject's scattered light scattered from the subject is incident on the image photographing module at a view angle ranging from −5° to 5°.

14. The contactless type optical device of claim 8, wherein the first lens includes a convex lens.

* * * * *